United States Patent [19]

Sakurai

[11] Patent Number: 5,581,685
[45] Date of Patent: Dec. 3, 1996

[54] HIERARCHICAL MENU SYSTEM PROVIDING A DEFINITION FILE FOR EACH MENU

[75] Inventor: Hiroko Sakurai, Kawasaki, Japan

[73] Assignee: Fujitsu Limited, Kawasaki, Japan

[21] Appl. No.: 355,004

[22] Filed: Dec. 13, 1994

[30] Foreign Application Priority Data

Mar. 18, 1994 [JP] Japan ..................... 6-074056

[51] Int. Cl.⁶ ..................... G06F 3/00
[52] U.S. Cl. ..................... 395/353
[58] Field of Search ..................... 395/155–161, 395/600, 700; 345/146, 902

[56] References Cited

U.S. PATENT DOCUMENTS

| | | | |
|---|---|---|---|
| 4,823,283 | 4/1989 | Diehm et al. | 395/156 |
| 5,220,675 | 6/1993 | Padawer et al. | 395/156 X |
| 5,261,042 | 11/1993 | Brandt | 395/156 |
| 5,345,550 | 9/1994 | Bloomfield | 395/156 |
| 5,392,386 | 2/1995 | Chalas | 395/155 |
| 5,398,312 | 3/1995 | Hoffmann | 395/156 |

FOREIGN PATENT DOCUMENTS

| | | | |
|---|---|---|---|
| 61-016317 | 1/1986 | Japan | G06F 3/02 |
| 61-082228 | 4/1986 | Japan | G06F 3/14 |
| 62-293339 | 12/1987 | Japan | G06F 3/14 |
| 3-222040 | 10/1991 | Japan | G06F 9/06 |

*Primary Examiner*—Mark R. Powell
*Assistant Examiner*—John E. Breene
*Attorney, Agent, or Firm*—Staas & Halsey

[57] ABSTRACT

A method of structuring definition files for a hierarchical-structure menu system including steps for providing menu display definition files for each corresponding menu display. Each of the menu display definition files define displayed menu items corresponding to another hierarchical level and processes to be performed by a corresponding menu item.

24 Claims, 11 Drawing Sheets

FIG. 2 PRIOR ART

```
OASYS:OASYS.EXE
SOFTWARE DEVELOPMENT
  RED:RED.EXE
  YPS         YPS EDITOR:YEDIT.BAT
              YPS/C COMPLIER:YCL.EXE
              PRINT:YPRN.EXE
  ECOLOGY:ECO.BAT
OA FUNCTION
  OFFICE COMMUNICATOR:OFC.BAT
  FM CABINET:FMCAB.EXE
  LOTUS1-2-3:LOTUS.BAT
SHUTDOWN:POFF
```

→ FIRST LEVEL MENU
→ SECOND LEVEL MENU
→ THIRD LEVEL NEMU

F I G. 5
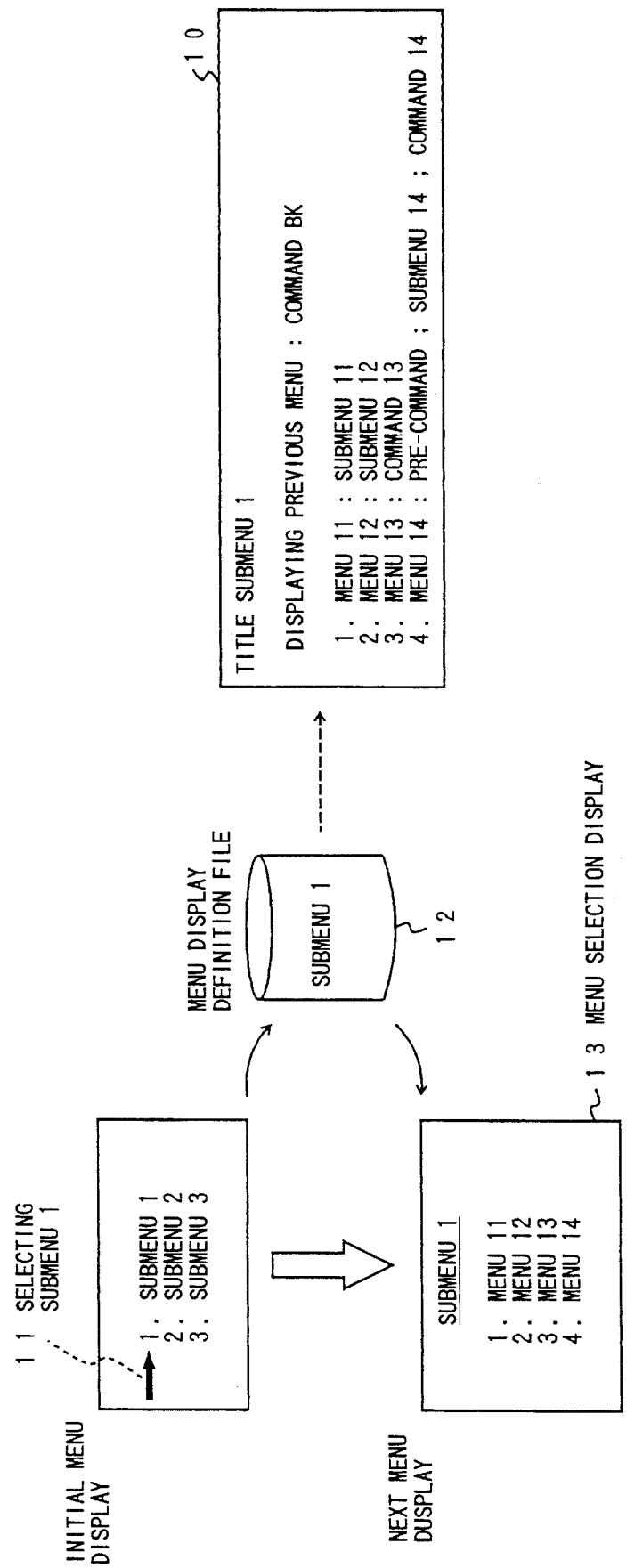

0.TBL   (INITIAL MENU DISPLAY)

FIG. 10A

1.TBL    (SECOND LEVEL MENU)

```
TITLE  : LOCAL MENU
1. INPUT/OUTPUT DATA DISPLAY  : IODATA.EXE   ②
2. HDLC COMMUNICATION TRACE   : #12.TBL
3. DEVICE STATUS DISPLAY      : STATUS.EXE   ③
4. ALARM HISTORY              : HISTORY.EXE  ④
5. TABLE MAINTENANCE          : *PWCK.EXE ; #15.TBL
6. TIME SETTING               : TMSET.EXE    ⑤
```

FIG. 10B

2.TBL    (SECOND LEVEL MENU)

```
TITLE    : REMOTE MENU
BACKMENU : LINOFF.BAT
1. HDLC COMMUNICATION TRACE   : #12.TBL
2. DEVICE STATUS DISPLAY      : STATUS.EXE   ③
3. ALARM HISTORY              : HISTORY.EXE  ④
```

FIG. 11A

12.TBL    (THIRD LEVEL MENU)

```
TITLE  : HDLC COMMUNICATION TRACE
1. TRACE SETTING   : TCSET.EXE   ⑥
2. TRACE DISPLAY   : TCDSP.EXE   ⑦
```

FIG. 11B

15.TBL    (THIRD LEVEL MENU)

```
TITLE  : TABLE MAINTENANCE
1. TABLE LOAD   : LDTBL.EXE   ⑧
2. TABLE SAVE   : SVTBL.EXE   ⑨
```

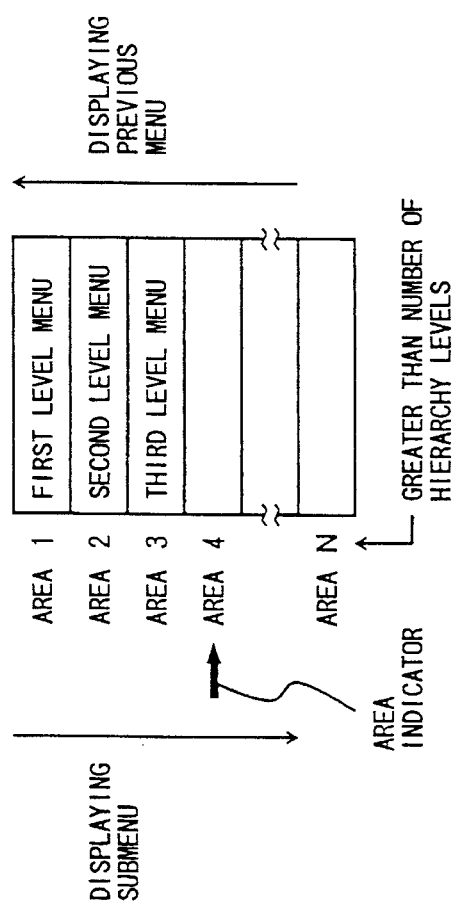

5,581,685

HIERARCHICAL MENU SYSTEM PROVIDING A DEFINITION FILE FOR EACH MENU

BACKGROUND OF THE INVENTION

1. Field of the Invention

The present invention generally relates to methods of constructing a hierarchical-structure menu system, and particularly relates to a method of constructing definition files for a hierarchical-structure menu system. Also, the present invention relates to a structure of such definition files and a device whose operations are based on the hierarchical-structure menu system constructed by the above method.

The method of constructing definition files according to the present invention makes it easier to create and modify menus having a hierarchical structure. Such menus enable users to execute programs by selecting a program in a displayed menu through a conversation-style interaction with a personal computer. Thus, users who are not familiar with personal computers can easily use such a menu system.

Hierarchical-structure menu systems are commonly employed in information processing systems so as to enable users to select a program from a list of programs and easily execute it. Such systems are disclosed, for example, in Japanese Laid-Open Patent Application No.61-82228, No.61-16317, and No.62-293339.

In such a hierarchical-structure menu system, as the number of items in a menu and/or the number of hierarchy levels grow, definition files defining contents shown in a menu display become complicated. This leads to a difficulty for users in creating and modifying the definition files. Thus, a set of rules of writing definition files needs to be simplified to reduce the work load on users in creating and modifying the definition files.

Depending on the application fields of menu displays, a menu system has to carry out other processes in addition to the execution of a selected item from the menu. Such processes include a password check, confirmation on the execution of the selected item, and establishing a connection of a communication line before executing the selected item. Also, there may be a need for changing a next process to be executed depending on a result of the execution of the selected item. Or a communication line which has been established with regard to a present menu display may need to be disconnected before returning to a previous menu display. Accordingly, a menu system which can satisfy the various needs as described above is required.

2. Description of the Prior Art

In a typical hierarchical-structure menu system of the prior art, a single definition file defines a list of items shown in a menu display as well as processes to be executed when those items are selected.

FIG. 1 shows an example of a hierarchical structure of a menu system of the prior art, and FIG. 2 shows a definition file for the menu system. As shown in FIG. 1, the hierarchical-structure menu system has a first menu display listing items 'OASYS', 'SOFTWARE DEVELOPMENT', 'OA FUNCTION', and 'SHUTDOWN'. When the item 'OASYS' is selected, for example, a word-processor program, OASYS.EXE, is executed. When the item 'SOFTWARE DEVELOPMENT' is selected, for example, a second display menu shows a list of items 'RED', 'YPS', and 'ECOLOGY', which are further detailed descriptions of 'SOFTWARE DEVELOPMENT'. In this manner, selecting a menu item which has sublevel menu items results in the display of the sublevel menu items, and selecting a menu item which does not have a sublevel results in the execution of that menu item.

In FIG. 2, the definition file defining the hierarchical structure of the menu system of FIG. 1 has a list of the items displayed in menu displays. In order to discriminate sublevel menus from the first level menu, sublevel items are listed with indentations of four characters on a next line of the pertinent item. Those indentations signify the fact that those items are sublevel items. For example, if the item 'SOFTWARE DEVELOPMENT' is the highest level menu item, the sublevel menu items 'RED', 'YPS', and 'ECOLOGY' are listed with four character indentations. Further, 'YPS EDITOR', 'YPS/C COMPILER', and 'PRINT' which are sublevel items of the item 'YPS' are listed with four character indentations on the next line after the item 'YPS'. With regard to an item which does not have any sublevel, an execution program for that item is listed after a colon ':' following that item on the same line.

In this method of defining menu items, it is clear which programs are defined in which menu items, as long as the numbers of menu items and hierarchy levels are small as in this example. However, as the number of menus grows, the definition file becomes too long to be simple and clear. Also, the number of characters which can be written on one line is limited (e.g., 80 characters), so that this limit restricts the depth (i.e., number of levels) of the hierarchical structure.

As described above, when a hierarchical-structure of menus is defined by a single definition file, the number of menu items and hierarchy levels are restricted. An attempt to include an excessively large number of definitions will require a complex set of grammar rules for the definitions used in a definition file.

As described above, there are cases in which some processes should be executed before executing a selected item, such processes including a password check, confirmation on execution, and establishment of a communication line. There is also a case in which a process needs to be executed before returning to a previous menu. In such cases, definitions of processes as well as menu items are all included in a menu program without using a definition file.

Using a menu program including menu items and processes as mentioned above is a second method of constructing a hierarchical-structure menu system.

FIG. 3 shows a flow chart of an exemplary processing of this menu program of the prior art. In this example, at a step S21, a selection is made with regard to a process to be carried out. At a step S22, a check is made whether the selection was made from listed items of the menu. If it was, the procedure goes to a step S23. At the step S23, one of the branches for the procedure is selected based on the selected item number. If the selected item is an item for executing a program, the pertinent program is executed to carry out a process 2 or a process 3 at a step S26 or a step S27. At a step S28, a current menu is displayed after the execution of that program. If predetermined programs such as a process A and a process B need to be executed before executing a program for the selected item, those predetermined programs are executed at a step S24. At a step S25, the program for the selected item is executed to carry out a process 1. At a step S28, the current menu is displayed after the completion of the process 1. If the selected item is an item for displaying a sublevel menu, the sublevel menu is displayed at a step S29 or a step S31. At a step S30 or S32, a further selection is made for a process to be carried out.

If it turns out at the step S22 that the selection was made at the step S21 for a process other than the listed items, the procedure goes to a step S33. Such a process may be selected by control code keys, function keys, etc., for selecting a return to a previous menu display, for selecting a help menu, and so on. At a step S33, one of branches are selected according to the selected key. If a key for returning to a previous menu display, for example, is selected, a process C which is necessary before returning to the previous menu is carried out at a step S34. Such a process includes the disconnection of the communication line which has been established for the current menu. Then, at a step S35, the previous menu is displayed.

As described in this example, there are cases where two processes (process A and process B) need to be carried out before the execution of the selected menu item, and where only one process (process C) needs to be carried out. The programs for those processes are incorporated in the menu program. Thus, when a user wishes to expand the variation of processes, the menu program needs to be modified. Also, since menus are incorporated in the menu program in this method, the hierarchical structure cannot be modified as easily as that of the method of using a definition file.

In the first method of the prior art, a hierarchical structure of a menu system is signified by indentations in a definition file. Thus, the numbers of menu items and hierarchy levels are limited by the size of the definition file. Increasing those numbers makes the set of grammar rules for the definition file become complicated so as to add an additional work load on users who create and modify the definition file. This means that the number of menus which can be increased practically has its limit.

In the second method of the prior art, processes necessary to be carried out before the execution of a selected item or before returning to a previous menu can be incorporated in the menu program. When the variations of the processes need to be increased or changed, however, the menu program itself has to be changed. The means that menus and menu items cannot be added or modified easily.

Accordingly, there is a need in the field of hierarchical-structure menu systems for a method of constructing a hierarchical-structure menu system which can construct a hierarchical structure with no restriction on the numbers of menu items and hierarchy levels. Also, there is a need for a method which allows an easy setup of processes necessary to be carried out before the execution of a selected item or before returning to a previous menu. Furthermore, there is a need for a device whose operations are based on a hierarchical-structure menu system constructed by the above methods.

SUMMARY OF THE INVENTION

Accordingly, it is a general object of the present invention to provide a method of constructing a hierarchical-structure menu system which can satisfy the needs described above.

It is another and more specific object of the present invention to provide a method of constructing a hierarchical-structure menu system which can construct a hierarchical structure with no restriction on the numbers of menu items and hierarchy levels.

In order to achieve the objects described above, according to the present invention, a method of structuring definition files for a hierarchical-structure menu system includes the steps of providing menu display definition files each for a corresponding one of menu displays which make up the hierarchical-structure menu system, defining in each of the menu display definition files items displayed on the corresponding one of the menu displays, and defining in each of the menu display definition files processes each carried out upon selection of a corresponding one of the items.

In the hierarchical-structure menu system based on this method, each of the menu displays is provided with one menu display definition file. Since the definition file has no restriction on the number of definitions of items, the number of menu items on one display is not limited by any means. Also, the number of definition files can be increased without restriction, so that the number of hierarchy levels can be increased as much as desired.

It is still another object of the present invention to provide a method of constructing a hierarchical-structure menu system which allows an easy setup of processes necessary to be carried out before the execution of a selected item or before returning to a previous menu.

In order to achieve this object, the method according to the present invention further includes a step of defining in the menu display definition files pre-processes, each of the pre-processes carried out upon selection of a corresponding one of the items before carrying out a corresponding one of the processes. Also, the method further includes a step of defining in the menu display definition files a menu pre-process, the menu pre-process being carried out before displaying a previous display upon selection of an item for returning to the previous display.

In this method according to the present invention, pre-processes which should be carried out before execution of a selected item or before returning to a previous menu can be specified in the menu display definition files. Thus, the setup of those pre-processes is much easier than the setup in the prior art in which each pre-processes should be incorporated in a menu program.

It is yet another object of the present invention to provide a device whose operations are based on the hierarchical-structure menu system constructed by the above methods.

In order to achieve this object, a device according to the present invention having a display and a keyboard, which device operates based on a hierarchical-structure menu system by displaying one of menu displays on the display, receiving instructions from a user on the keyboard, and carrying out processes based on the instruction, said hierarchical-structure menu system comprising menu display definition files each provided for a corresponding one of menu displays which make up the hierarchical-structure menu system, each of the menu display definition files comprising definitions of items displayed on the corresponding one of the menu displays and definitions of processes each carried out upon selection of a corresponding one of the items.

Other objects and further features of the present invention will be apparent from the following detailed description when read in conjunction with the accompanying drawings.

BRIEF DESCRIPTION OF THE DRAWINGS

FIG. 2 is an illustrative drawing showing a definition file for the hierarchical-structure menu system of FIG. 1;

FIG. 5 is an illustrative drawing of a principle of the present invention;

FIGS. 10A and 10B are illustrative drawings of further examples of the menu display definition files;

FIGS. 11A and 11B are illustrative drawings of yet further examples of the menu display definition files;

FIGS. 13A to 13D are illustrative drawings of a display-file-name storage area for storing a menu history.

DESCRIPTION OF THE PREFERRED EMBODIMENTS

Figure 1:
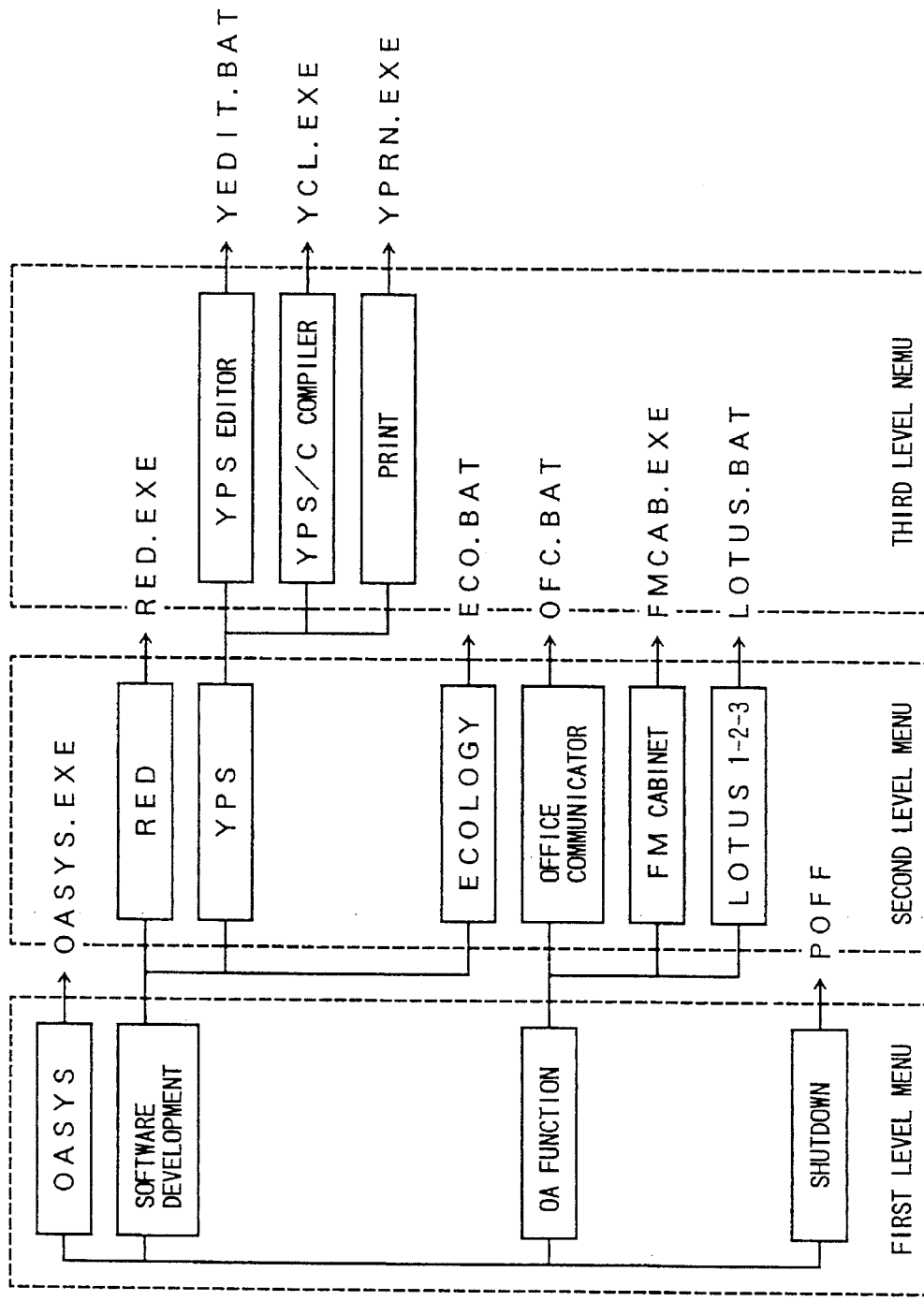
FIG. 1 is an illustrative drawing showing an example of a hierarchical-structure menu system of the prior art.
Figure 3:
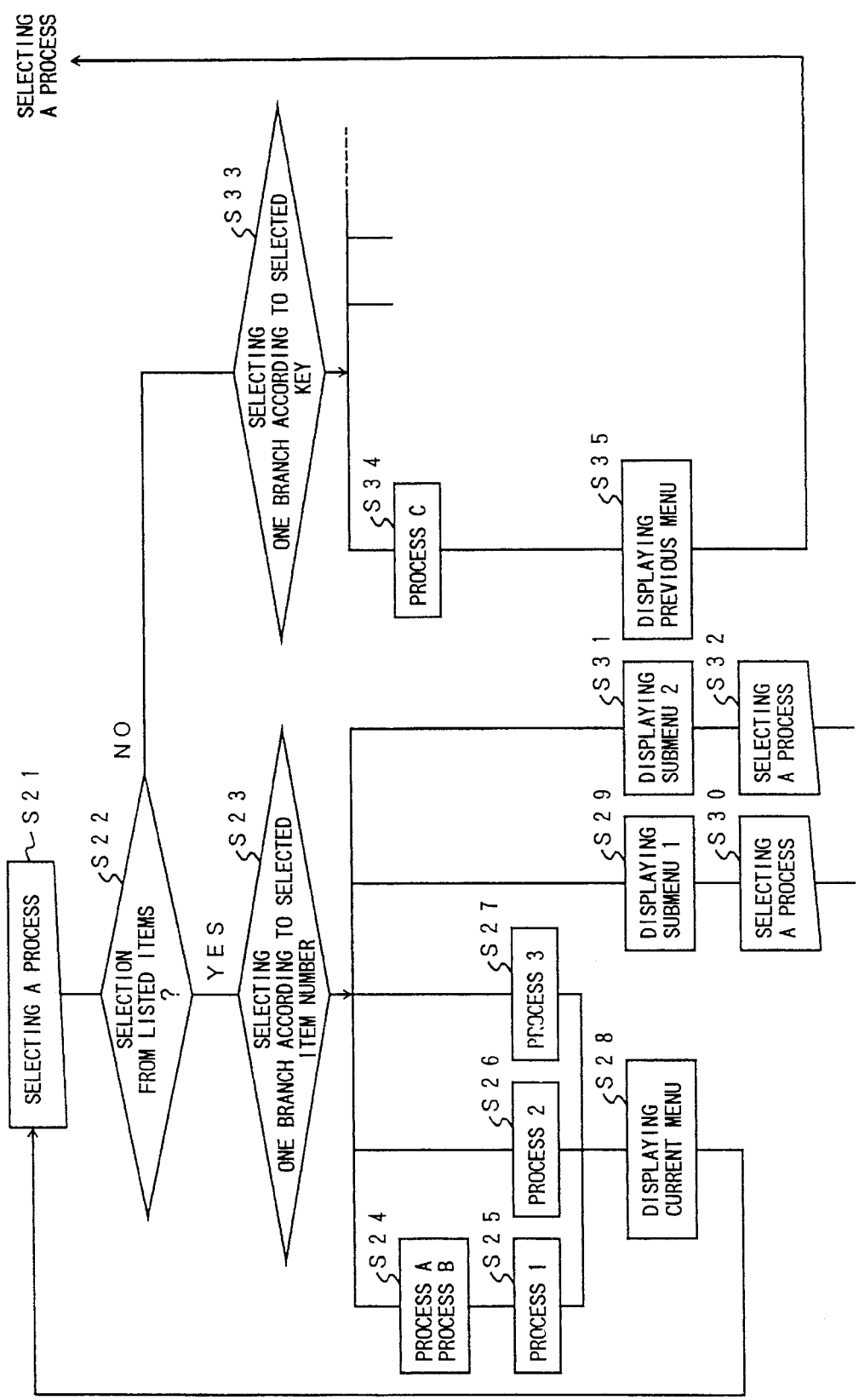
FIG. 3 is a flow chart of exemplary processing of another hierarchical-structure menu system of the prior art.
Figure 4:
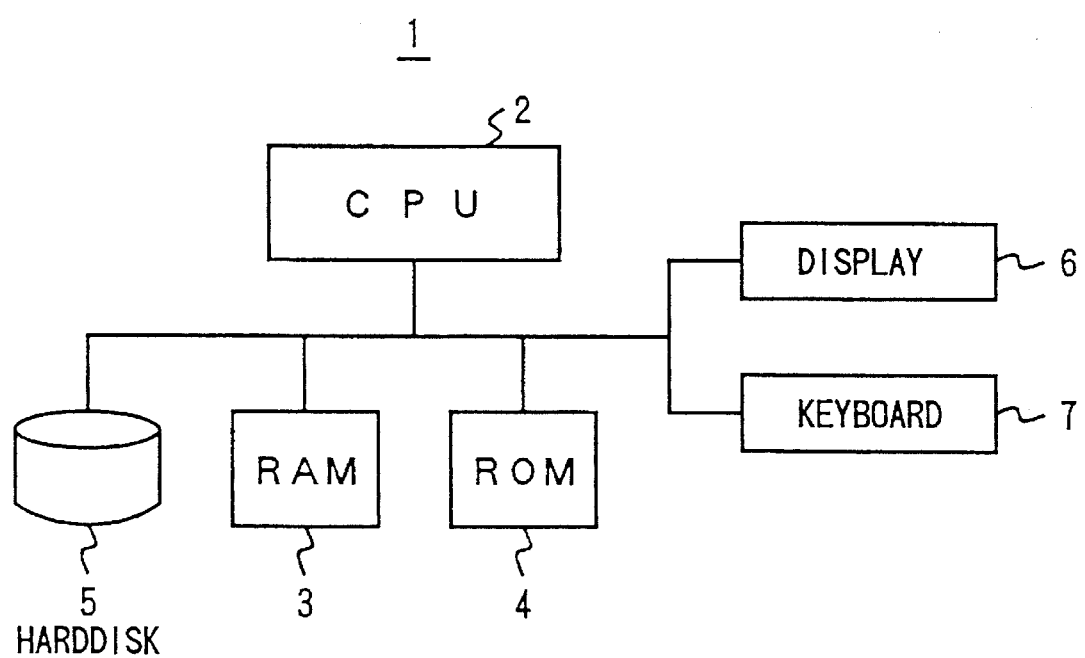
FIG. 4 is a block diagram of an example of device according to the present invention.

FIG. 4 shows an example of a device whose operations are based on a hierarchical-structure menu system constructed by a method according to the present invention.

In FIG. 4, the device 1 includes a CPU (Central Processing Unit) 2, a RAM (Random Access Memory) 3, a ROM (Read Only Memory) 4, a harddisk 5, a display 6, and a keyboard 7.

The harddisk 5 stores the hierarchical-structure menu system constructed by the method according to the present invention. That is, the harddisk 5 stores definition files for the menu system, programs for the operations of the menu system, and application programs which are executed by selecting an item on the menu. The RAM 3 constitutes the memory space of the CPU 2 which stores part of the menu system and the application programs called up from the harddisk 5. The ROM 4 stores programs for controlling the CPU 2. The display 6 displays a menu based on the hierarchical-structure menu system stored in the harddisk and called up to the RAM 3. A user of the device interacts with the hierarchical-structure menu system through menus shown on the display 6 and operations on the keyboard 7.

In the device carrying out the hierarchical-structure menu system shown in FIG. 4, the CPU 2 performs tasks necessary for the operations of the hierarchical-structure menu system.

FIG. 5 shows a principle of the present invention. Assume that an initial menu display shows 'submenu 1', 'submenu 2', 'submenu 3', etc. Selecting 'submenu 1' (shown by 11) at this initial menu display results in a next menu display showing a menu selection display 13 based on a menu display definition file 12 for submenu 1.

Contents 10 of the menu display definition file 12 are shown on the right of FIG. 5. The contents 10 includes menu items shown on the menu selection display 13 and definitions of processes which will be performed upon the selection of a corresponding item. In the definition file 12, there are one-to-one relations between the menu items and the processes. Since one definition file contains definitions only for the same level in the hierarchy, grammars can be simple, and the numbers of menu items and hierarchy levels can be increased without a limit.

Figure 6:
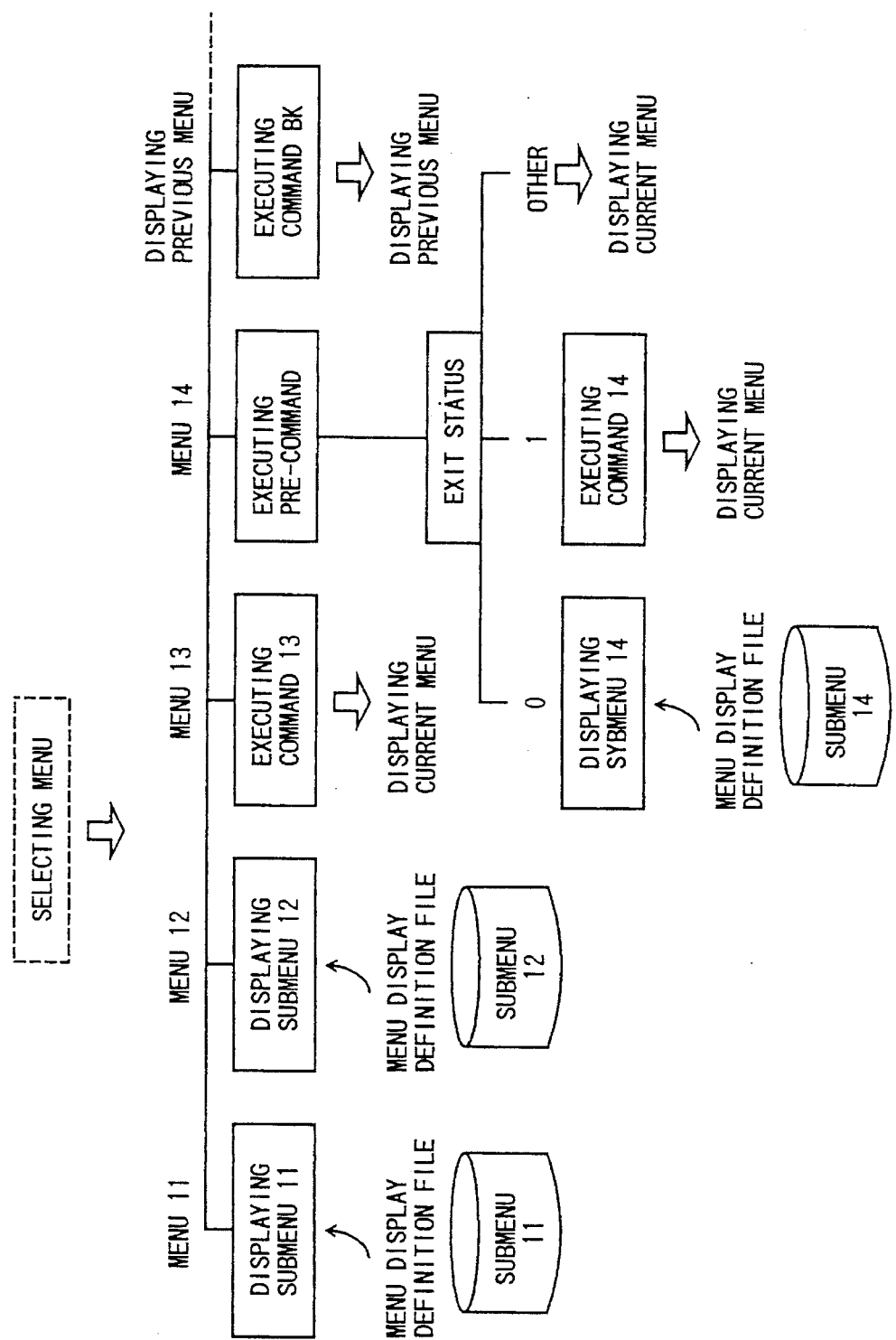
FIG. 6 is an another illustrative drawing of a principle of the present invention.

FIG. 6 shows processes to be carried out according to a selected item in the contents 10 of FIG. 5. With reference to FIG. 5 and FIG. 6, the processes listed in the contents 10 will be described below.

In the contents 10 of the menu display definition file 12, there are two different types of definitions, one defining other definition files and the other defining commands to be executed. For such menu items as a menu item 11 and a menu item 12 for displaying other submenus, the names of menu display definition files for those submenus are given as definitions. For such menu items as a menu item 13 for executing commands, the names of those commands are given as definitions. When executing a command, the current menu will be displayed after the completion of the execution of the command as shown in FIG. 6. In this manner, submenus can be defined as lower level menus depending on and located below a parent menu. Also, a structure of the menu hierarchy can be changed easily.

For such menu items as a menu item 14 which needs the execution of another process before the execution of the selected item, the name of a command for that process is given as a preceding command. Furthermore, depending upon the exit status of the preceding command, a selection can be made between the display of the submenu 14 or the execution of the command 14. If the exit status is not one of the defined, the current display will be shown after the execution of the preceding command. As shown in FIG. 5 and FIG. 6, if the exit status is 0, the submenu 14 is displayed based on a menu display definition file for the submenu 14. If the exit status is 1, a command 14 is executed, and, then, the current menu will be displayed. If the exit status is neither 0 nor 1, the current menu will be displayed without any additional processes.

If there is a process necessary to be carried out before returning to a previous menu (the initial menu in this case), the name of a command for that process is given in the definition file 12 as shown in the contents 10 of FIG. 5. In this example, the command is denoted as BK. Thus, when return to a previous menu is selected, the previous menu is displayed after executing the command BK as shown in FIG. 6.

In this manner, even when there are processes necessary to be carried out before executing a selected menu item or returning to a previous menu, the menu program does not have to incorporate programs of those processes. This means that the menu system can be easily modified or added to with new items.

In the following, a description will be given of an embodiment of the present invention.

Figure 7:
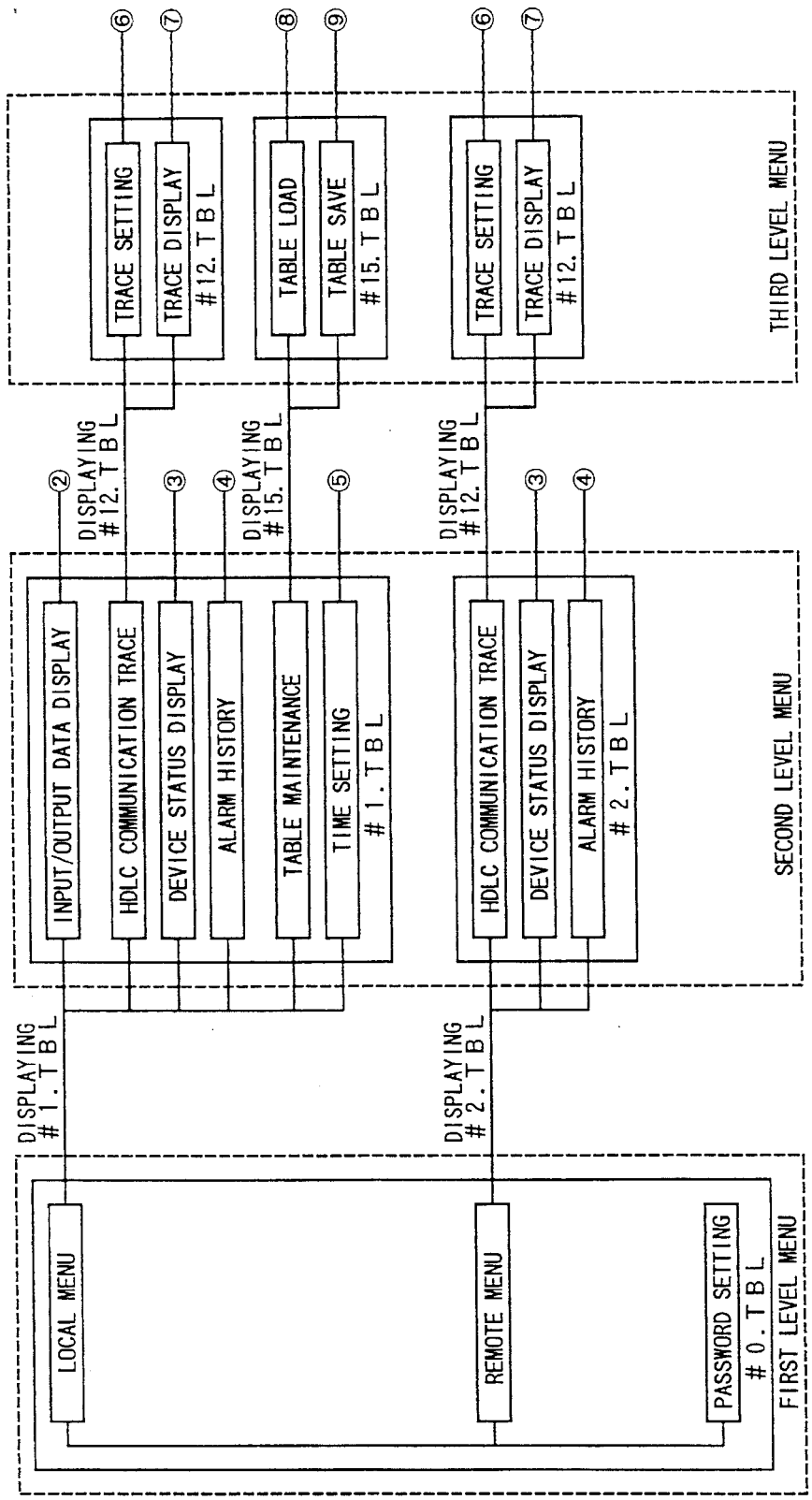
FIG. 7 is an illustrative drawing showing an example of a hierarchical-structure menu system of the present invention.

FIG. 7 shows an illustrative drawing of an embodiment of the hierarchical-structure menu system constructed by the method of the present invention.

In FIG. 7, the initial menu (first level menu) includes 'LOCAL MENU', 'REMOTE MENU', and 'PASSWORD SETTING'. The item 'LOCAL MENU' has a submenu which lists items, 'INPUT/OUTPUT DATA DISPLAY', 'HDLC COMMUNICATION TRACE', 'DEVICE STATUS DISPLAY', 'ALARM HISTORY', 'TABLE MAINTENANCE', and 'TIME SETTING'. Among those, the item 'HDLC COMMUNICATION TRACE' has a further submenu comprised of 'TRACE SETTING' and 'TRACE DISPLAY', and the item 'TABLE MAINTENANCE' has a submenu comprised of 'TABLE LOAD' and 'TABLE SAVE'. In the same manner, the item 'REMOTE MENU' on the initial menu has a submenu comprised of 'HDLC COMMUNICATION TRACE', 'DEVICE STATUS DIS- PLAY', and 'ALARM HISTORY'. Among those, the item 'HDLC COMMUNICATION TRACE' has a further submenu which has items 'TRACE SETTING' and 'TRACE DISPLAY'.

In this hierarchical-structure menu, when 'LOCAL MENU' on the initial menu is selected, #1.TBL of its submenu is displayed. In order to select the item 'TABLE MAINTENANCE' in this submenu, a password is required to be entered. When the item 'HDLC COMMUNICATION TRACE' or the item 'TABLE MAINTENANCE' is selected, a respective corresponding submenu #12.TBL or #15.TBL is displayed.

When 'REMOTE MENU' at the initial menu is selected, #2.TBL of its submenu is displayed, and the connection of a communication line is carried out as a pre-process of the submenu. Here, the communication line is disconnected at a pre-process prior to return to the initial display from the submenu. When 'HDLC COMMUNICATION TRACE' is selected on the submenu, #12.TBL is displayed the same as before. When the menu items which do not have submenus of their own are selected, corresponding commands (1) to (7) are executed. Those commands are shown in FIG. 9 to FIGS. 11A and 11B, which will be described later.

A menu display definition file is provided for each of the menu displays (i.e., #0.TBL, #1.TBL, #2.TBL, #12.TBL, and #15.TBL). In the case that a menu display appears with the same menu items and the same processes at more than one place as does #12.TBL, the same menu display definition file can be used.

Figure 8:
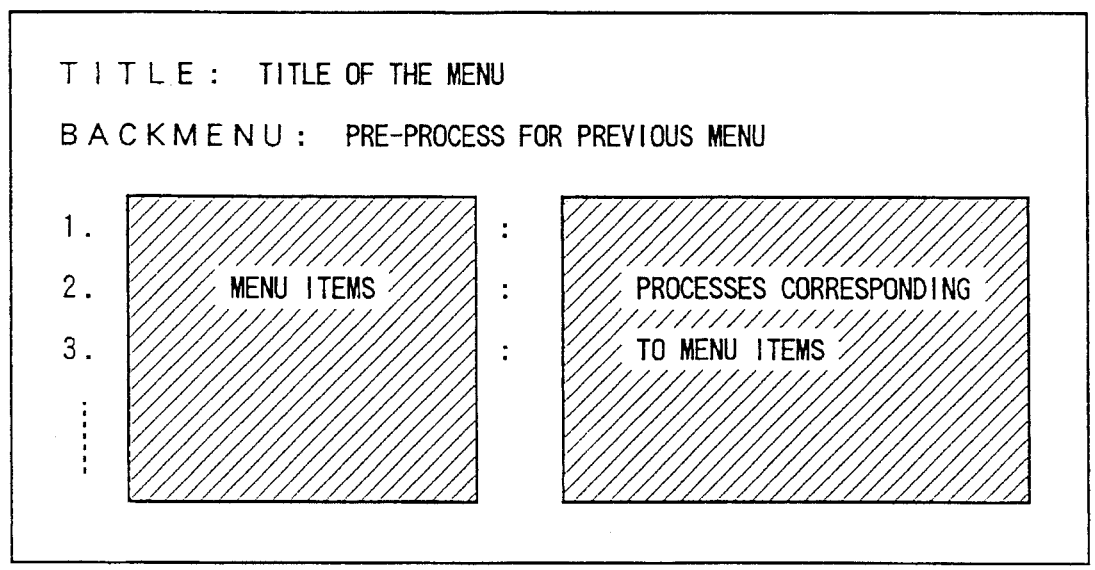
FIG. 8 is an illustrative drawing showing definitions of items in a menu display definition file according the present invention.

FIG. 8 shows a method of defining items in the menu display definition files. Contents defined in the menu display definition files include menu items displayed in the menu display, the title of the menu, and processes to be enacted upon selecting menu items. The title is defined after a colon ':' by providing characters displayed in the menu display. After the colon following 'BACKMENU', a process which is to be carried out as a pre-process before going back to a previous menu display is defined. Menu items on the menu display such as 'LOCAL MENU', 'REMOTE MENU', etc., are defined in the left of the menu display definition file, and processes corresponding to the menu items are defined after the colons.

The definition of the processes are as follows. In the case of displaying a further submenu, the name of the submenu is defined. On the other hand, in the case of executing an executable program, the name of the executable program is defined. In the case that a pre-process should be carried out before taking a selected action, the fact that there is a pre-process to be carried out is indicated by an asterisk '*' after a colon ':', and the name of the program is defined after that. When there are a plurality of different processes to be carried out depending on the exit status of the pre-process, those processes are defined one after another with ';' between them. Namely, those processes are listed as in 'a process for the exit status 0; a process for the exit status 1; a process for the exit status 2; ... '. As described earlier, in the event of an exit status of no definition, the current menu is displayed.

Since a menu display definition file is created for each of the menu displays, other information can be defined such as comments for menu items, a message for each menu display, a variable indicating whether or not to show a clock on the display.

Figure 9:
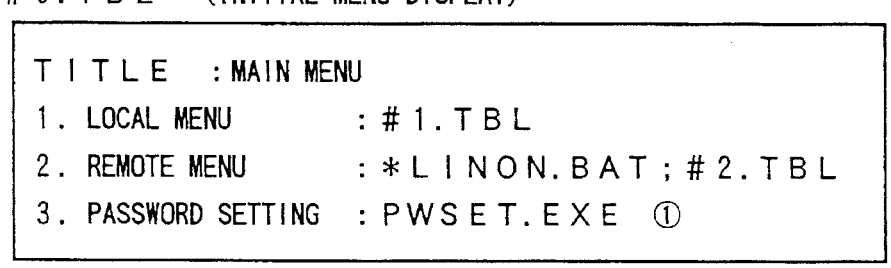
FIG. 9 is an illustrative drawing of an example of the menu display definition file.

FIG. 9 to FIGS. 11A and 11B show menu display definition files. FIG. 9 shows a menu display definition file corresponding to the initial menu display #0.TBL, and FIGS. 10A and 10B show menu display definition files corresponding to second level submenu displays #1.TBL and #2.TBL, respectively. Also, FIGS. 11A and 11B show the third level displays #12.TBL and #15.TBL, respectively.

As shown in those figures, creating menu display definition files based on menu displays enables the arrangement of the menu items to be defined in a similar form to the display images themselves. Also, since one file represents one display, the size of the file does not become too large. Even when the number of menu displays becomes large, the number of files can be increased so that the hierarchy levels are not limited.

A further detailed description of the menu definition file will be given with reference to FIG. 9 to FIGS. 11A and 11B.

Referring to FIG. 9, the menu display definition file #0.TBL will be described first. The first item '1. LOCAL MENU' is defined to display the menu display #1.TBL upon the selection of this item. The second item '2. REMOTE MENU' is defined to carry out a pre-process 'LINON.BAT' for connecting a communication line, and, then, display the menu display #2.TBL if the exit status of the pre-process is 0. In the case of other exit statuses, the current display (#0.TBL) will be displayed. The third item 'PASSWORD SETTING' is defined to execute a program PWSET.EXE.

Referring to FIG. 10A, the menu display definition file #1.TBL will be described. The first, third, fourth, and sixth items, i.e., 'INPUT/OUTPUT DATA DISPLAY', 'DEVICE STATUS DISPLAY', 'ALARM HISTORY', AND 'TIME SETTING' are defined to execute one of the programs, 'IODATA.EXE', 'STATUS.EXE', 'HISTORY.EXE', and 'TMSET.EXE' upon the selection of a corresponding item. The second item 'HDLC COMMUNICATION TRACE' is defined to display the menu display #12.TBL. The fifth item 'TABLE MAINTENANCE' is defined to carry out a password check (PWCK.EXE) as a pre-process to be carried out upon the selection of the item. The menu display #15.TBL will be displayed if the exit status of the pre-process is 0, and the current display (#1.TBL) will be displayed otherwise.

With reference to FIG. 10B, the menu display definition file #2.TBL will be described. The first item 'HDLC COMMUNICATION TRACE' is defined to display the menu display #12.TBL. The executions of the programs 'STATUS.EXE' and 'HISTORY.EXE' are defined for the second item 'DEVICE STATUS DISPLAY' and the third item 'ALARM HISTORY', respectively The item 'BACKMENU' is defined to execute a program 'LINOFF.BAT' for disconnecting the communication line as a pre-process prior to returning to the previous menu display #0.TBL. In this manner, a process which should be carried out before returning to a previous display is defined after 'BACKMENU:'. Thus, the execution of a pre-process program can be realized by naming a program to be carried out in the menu display definition file, so that there is no need to incorporate the pre-process program into the menu program.

In FIGS. 11A and 11B, similar definitions to the above are provided for the menu display definition files #12.TBL and #15.TBL. Namely, programs are defined to be executed upon the selection of corresponding items.

With the use of the menu display definition files as described above, such processes can be set up easily as confirmation of execution, a password check for limiting access from users, and a connection or a disconnection of a communication line. As for a pre-process which should be carried out before executing a menu item, different processes can be carried out depending on the exit status of the pre-process. Thus, for example, with a password check program which has different exit statuses for different password entries, it is possible to display different menu displays depending on a password entry.

In the above description, only one pre-process before executing a selected item and only one pre-process before returning to a previous menu display can be defined. Nonetheless, a plurality of pre-processes can be carried out by incorporating those pre-processes in a batch file. In the menu display definition file, a command to execute a program can have parameters, also.

Figure 12:
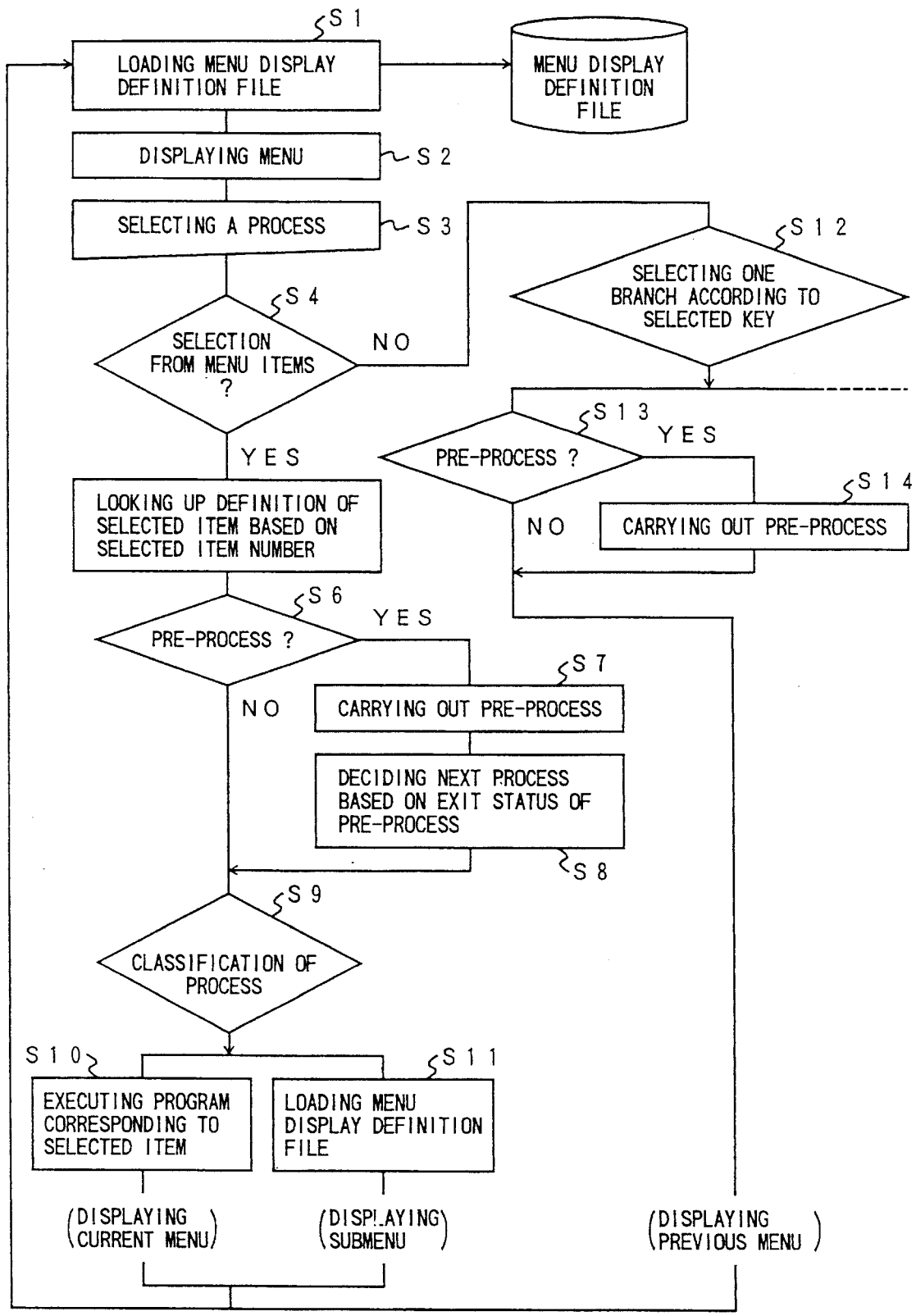
FIG. 12 is a flow chart of processing of the hierarchical-structure menu system according to the present invention.

FIG. 12 shows a flow chart of a process for the hierarchical-structure file system in which a definition file is provided for each menu display as described above. In the prior art, only one menu display definition file is provided, so that the definition file is stored in a memory so as to be easily loaded before displaying the initial display. On the other hand, in the present invention, a definition file is provided for each menu display, so that each definition file is loaded at the time of displaying a corresponding display.

In FIG. 12, at a step S1, a menu display definition file corresponding to a pertinent menu is loaded. At a step S2, the loaded definition file is stored in a memory in such a manner that the contents of the file are easily accessed, and a menu is displayed based on the loaded definition file. At a step S3, a selection is made as to a process to be carried out. At a step S4, a check is made whether the selection was made from menu items. If it was, the procedure goes to a step S5. At the step S5, the contents of the menu corresponding to the selected item are looked up based on the selected item number. At a step S6, it is checked whether there is a pre-process to be carried out. If there is, the procedure goes to a step S7. If there is no pre-process, the procedure proceeds to a step S9. At the step S7, the pre-process is carried out. At a step S8, the next process to be carried out is decided based on the exit status of the pre-process. At the step S9, a check is made whether the selected process is a menu item execution or a submenu display. If it is a menu item execution, at the step S10, a program corresponding to the selected menu item is executed as a child process, and the current menu is displayed by loading the menu display definition file again.

It the selected process is a submenu display, at a step S11, a submenu is displayed by loading a corresponding menu display definition file. At the same time, the file name of the submenu is stored in a display-file-name storage area allocated in a memory.

FIG. 13A shows the display-file-name storage area, which has separate storage areas in a greater number than the number of hierarchy levels. An area indicator is incremented by one each time a new submenu is displayed, i.e., each time the display proceeds to a next menu. On the other hand, the area indicator is decremented by one each time a previous menu is displayed, i.e., each time the display returns to a previous menu. In this manner, the history of menu selections as to a movement in a depth direction of the hierarchy can be stored in the display-file-name storage area.

At the step S3, a selection can be made by using such keys as function keys in order to control the pages of the menu on a screen, display a HELP menu, etc. If it is decided at the step S4 that the selection was made by using such keys, the procedure goes to a step S12. At the step S12, one of branches is selected according to the selected key.

If the selection was made for return to a previous menu, the procedure proceeds as follows. At a step S13, a check is made whether there is a pre-process to be carried out before returning to a previous process, i.e., whether there is a command defined in the item 'BACKMENU'. If there is, the pre-process is carried out at a step S14. At this point of time, the name of a definition file of the previous display is read from the display-file-name storage area. At the same time, the area indicator is decremented by one.

In FIGS. 13B through 13D, file names are stored by taking as an example the menu system of FIG. 7. If 'LOCAL MENU' is selected at the initial menu, the file name #1.TBL is stored in an area 2. An additional selection of 'HDLC COMMUNICATION TRACE' results in the file name #12.TBL being stored in an area 3. If a selection is made for return to a previous display at this point, a menu display corresponding to the file name #1.TBL stored in the area 2 is displayed. Since the current hierarchy level has returned to the second level, an area which stores a file name at the time of displaying a next submenu is the area 3, again.

As described above, according to the present invention, users can freely decide the structure of a menu system without any restrictions on the numbers of menu items and hierarchy levels. Also, a set grammar rules for definitions of the menu display definition file is simplified so that creating definition files has become easy. Furthermore, pre-processes which should be carried out before executing menu items or returning to a previous menu can be easily incorporated into this menu system by specifying program names of those pre-processes. Consequently, the addition of new menus and the modification of the menu system can be easily carried out.

Such processes as switching between a local mode and a remote mode should be incorporated along with a menu structure into a menu program for different platforms in the prior art. In the present invention, however, incorporation of such processes into the menu system can be made by simply specifying those processes in the definition files, so that such an incorporation can be done at a single platform.

Further, the present invention is not limited to these embodiments, but various variations and modifications may be made without departing from the scope of the present invention.

What is claimed is:

1. A method of structuring definition files for a hierarchical-structure menu system, said method comprising the steps of:

(a) providing menu display definition files each for a corresponding one of menu displays which make up said hierarchical-structure menu system;

(b) defining in each of said menu display definition files items displayed on said corresponding one of said menu displays; and (c) defining in each of said menu display definition files processes each carried out upon selection of a corresponding one of said items.

2. The method as claimed in claim 1, wherein said step (c) further comprises the step of defining in at least one of said menu display definition files names of some of said menu display definition files, so that some of said menu displays corresponding to said names can be treated as submenus located below menu displays corresponding to said at least one of said menu display definition files in said hierarchical-structure menu system, wherein a name of one of said menu display definition files is not defined in said one of said menu display definition files.

3. The method as claimed in claim 1, wherein said step (c) further comprises the step of defining in each of said menu display definition files names of commands, so that one of said commands is executed upon selection of a corresponding one of said items.

4. The method as claimed in claim 1, wherein said step (c) further comprises the step of defining in each of said menu display definition files either a name of a command or a name of another menu display definition file for each of said items, so that selection of one of said items results either in execution of a corresponding command or in displaying a corresponding submenu display.

5. The method as claimed in claim 1, further comprising a step (d) of defining in said menu display definition files pre-processes, each of said pre-processes carried out upon selection of a corresponding one of said items before carrying out a corresponding one of said processes.

6. The method as claimed in claim 5, wherein said step (c) further comprises the step of defining in said menu display definition files different processes for one of said items, one of said different processes being carried out according to an exit status of a corresponding one of said pre-processes.

7. The method as claimed in claim 6, wherein a current menu is displayed if said exit status corresponds to none of said different processes.

8. The method as claimed in claim 1, further comprising a step (e) of defining in said menu display definition files a menu pre-process, said menu pre-process being carried out before displaying a previous display upon selection of an item for returning to said previous display.

9. A structure of definition files for a hierarchical-structure menu system comprising:

menu display definition files each provided for a corresponding one of menu displays which make up said hierarchical-structure menu system, each of said menu display definition files comprising definitions of items displayed on said corresponding one of said menu displays and definitions of processes each carried out upon selection of a corresponding one of said items.

10. The structure as claimed in claim 9, wherein at least one of said menu display definition files further comprises names of some of said menu display definition files as said definitions of processes, so that some of said menu displays corresponding to said names can be treated as submenus located below menu displays corresponding to said at least one of said menu display definition files in said hierarchical-structure menu system, wherein a name of one of said menu display definition files is not defined in said one of said menu display definition files.

11. The structure as claimed in claim 9, wherein said menu display definition files further comprise names of commands as said definitions of processes, so that one of said commands is executed upon selection of a corresponding one of said items.

12. The structure as claimed in claim 9, wherein said menu display definition files further comprise either a name of a command or a name of another menu display definition file for each of said definitions of processes, so that selection of one of said items results either in execution of a corresponding command or in displaying of a corresponding submenu display.

13. The structure as claimed in claim 9, wherein said menu display definition files further comprise definitions of pre-processes in addition to said definitions of said processes, each of said pre-processes carried out upon selection of a corresponding one of said items before carrying out a corresponding one of said processes.

14. The structure as claimed in claim 13, wherein said menu display definition files further comprise definitions of different processes corresponding to one of said items as said definitions of processes, one of said different processes being carried out according to an exit status of a corresponding one of said pre-processes.

15. The structure as claimed in claim 14, wherein a current menu is displayed if said exit status corresponds to none of said different processes.

16. The structure as claimed in claim 9, wherein said menu display definition files further comprises a definition of a menu pre-process, said menu pre-process being carried out before displaying a previous display upon selection of an item for returning to said previous display.

17. A device operating based on a hierarchical-structure menu system, said device comprising:

a display displaying menu displays which make up said hierarchical-structure menu system;

a keyboard receiving instructions from a user;

a controller carrying out processes according to said instructions by using menu display definition files; and a memory storing said menu display definition files each corresponding to one of said menu displays, each of said menu display definition files comprising definitions of items displayed on said corresponding one of said menu displays and definitions of said processes each carried out upon selection of a corresponding one of said items.

18. The device as claimed in claim 17, wherein at least one of said menu display definition files further comprises names of some of said menu display definition files as said definitions of said processes, so that some of said menu displays corresponding to said names can be treated as submenus located below menu displays corresponding to said at least one of said menu display definition files in said hierarchical-structure menu system, wherein a name of one of said menu display definition files is not defined in said one of said menu display definition files.

19. The device as claimed in claim 17, wherein said menu display definition files further comprise names of commands as said definitions of said processes, so that one of said commands is executed upon selection of a corresponding one of said items.

20. The device as claimed in claim 17, wherein said menu display definition files further comprise either a name of a command or a name of another menu display definition file for each of said definitions of said processes, so that selection of one of said items results either in execution of a corresponding command or in displaying of a corresponding submenu display.

21. The device as claimed in claim 17, wherein said menu display definition files further comprise definitions of pre-processes in addition to said definitions of said processes, each of said pre-processes carried out upon selection of a corresponding one of said items before carrying out a corresponding one of said processes.

22. The device as claimed in claim 21, wherein said menu display definition files further comprise definitions of different processes corresponding to one of said items as said definitions of said processes, one of said different processes being carried out according to an exit status of a corresponding one of said pre-processes.

23. The device as claimed in claim 22, wherein a current menu is displayed if said exit status corresponds to none of said different processes.

24. The device as claimed in claim 17, wherein said menu display definition files further comprises a definition of a menu pre-process, said menu pre-process being carried out before displaying a previous display upon selection of an item for returning to said previous display.

* * * * *